United States Patent
Wang et al.

(10) Patent No.: US 10,282,830 B2
(45) Date of Patent: May 7, 2019

(54) APPARATUS FOR IMAGE CONTRAST ENHANCEMENT AND METHOD, ELECTRONIC EQUIPMENT

(71) Applicant: FUJITSU LIMITED, Kawasaki (JP)

(72) Inventors: Bingrong Wang, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 15/204,498

(22) Filed: Jul. 7, 2016

(65) Prior Publication Data

US 2016/0321790 A1 Nov. 3, 2016

Related U.S. Application Data

(63) Continuation of application No. PCT/CN2014/070287, filed on Jan. 8, 2014.

(51) Int. Cl.
*G06T 5/40* (2006.01)
*G06T 5/20* (2006.01)
*G06T 5/00* (2006.01)

(52) U.S. Cl.
CPC ............... *G06T 5/40* (2013.01); *G06T 5/009* (2013.01); *G06T 5/20* (2013.01); *G06T 2207/20192* (2013.01)

(58) Field of Classification Search
CPC ... G06T 2207/20192; G06T 5/20; G06T 5/40; G06T 5/009; G06T 5/00; G06T 5/002;
(Continued)

(56) References Cited

U.S. PATENT DOCUMENTS 8,417,064 B2 4/2013 Wakazono et al.
8,594,444 B2 11/2013 Geiger et al.
(Continued)

FOREIGN PATENT DOCUMENTS

CN 101951523 A * 1/2011
CN 103049908 A 4/2013
(Continued)

OTHER PUBLICATIONS

International Search Report dated Apr. 3, 2014 in corresponding International Application No. PCT/CN2014/070287.
(Continued)

*Primary Examiner* — Kim Y Vu
*Assistant Examiner* — Michael J Vanchy, Jr.
(74) *Attorney, Agent, or Firm* — Staas & Halsey LLP

(57) ABSTRACT

An apparatus for image contrast enhancement and a method, electronic equipment that includes: a dividing unit configured to divide an input image into at least two layers; and detail degrees of the at least two layers are different; an enhancing unit configured to perform contrast enhancement on each of the at least two layers respectively; and degrees of enhancing contrasts of the layers are different; and a combining unit configured to combine the contrast-enhanced at least two layers. By dividing the input image into at least two layers with different detail degrees and performing contrast enhancement on the at least two layers at different degrees, the contrast of the image may be accurately and effectively enhanced, thereby a display effect of the image may be improved.

15 Claims, 5 Drawing Sheets

(58) Field of Classification Search
CPC . G06T 5/003; G06T 7/11; G06T 7/194; G06T 2207/20221; G06T 7/12; G06T 7/13; H04N 1/4092; H04N 5/142; H04N 1/58; H04N 5/208; H04N 9/646; H04N 1/409
See application file for complete search history.

(56) References Cited

U.S. PATENT DOCUMENTS

| | | | | |
|---|---|---|---|---|
| 2004/0047513 | A1* | 3/2004 | Kondo | G06T 7/44 382/254 |
| 2011/0019096 | A1 | 1/2011 | Lee et al. | |
| 2011/0280494 | A1* | 11/2011 | Da Rocha Leitao | G06T 5/002 382/274 |
| 2012/0038800 | A1* | 2/2012 | Jang | H04N 1/4092 348/252 |

FOREIGN PATENT DOCUMENTS

| | | |
|---|---|---|
| CN | 103295191 A | 9/2013 |
| CN | 103679657 | 3/2014 |
| JP | 2009-516882 | 4/2009 |
| WO | 2009/072537 A1 | 6/2009 |

OTHER PUBLICATIONS

Written Opinion dated Apr. 3, 2014 in corresponding International Application No. PCT/CN2014/070287**.
Examination Report under section 18(3) dated Aug. 1, 2016 in corresponding European Patent Application No. GB1610745.0.
Japanese Office Action dated Oct. 3, 2017 in corresponding Japanese Patent Application No. 2016-5445090.
Zeev Farbman et al.: "Edge-Preserving Decompositions for Multi-Scale Tone and Detail Manipulation," ACM Transactions on Graphics, vol. 27, No. 3, Article 67, Aug. 11, 2008 URL: http://dl.acm.org/citation.cfm?id=1360666.
Chinese Office Action dated Feb. 2, 2018 in corresponding Chinese Patent Application No. 201480072445.9, 7 pages.
Chinese Search Report dated Feb. 2, 2018 in corresponding Chinese Patent Application No. 201480072445.9, 3 pages.
Chinese Office Action dated Sep. 5, 2018 in corresponding Chinese Patent Application No. 201480072445.9, 10 pgs.
Decision of Rejection dated Feb. 1, 2019 in related Chinese Patent Application No. 201480072445.9 (5 pages) (6 pages English Translation).

* cited by examiner

APPARATUS FOR IMAGE CONTRAST ENHANCEMENT AND METHOD, ELECTRONIC EQUIPMENT

CROSS-REFERENCE TO RELATED APPLICATIONS

This application is a continuation application, filed under 35 U.S.C. § 111(a), of International Application PCT/CN2014/070287 filed on Jan. 8, 2014, the entire contents of which are hereby incorporated by reference.

BACKGROUND

1. Field

The present disclosure relates to the field of image processing, and in particular to an apparatus for image contrast enhancement and a method for electronic equipment.

2. Description of the Related Art

As the continuous development of the information technologies, requirements on image display effects become higher and higher, and image contrast enhancement is one of important means for improving the image display effects. Currently, main methods for image contrast enhancement are: a method of global tone reproduction, a method of global histogram equalization, a homomorphic filtering method, and a multi-scale Retinex algorithm.

It should be noted that the above description of the background is merely provided for clear and complete explanation of the present disclosure and for easy understanding by those skilled in the art. And it should not be understood that the above technical solution is known to those skilled in the art as it is described in the background art of the present disclosure

SUMMARY

Additional aspects and/or advantages will be set forth in part in the description which follows and, in part, will be apparent from the description, or may be learned by practice of the invention.

The following defects exist in the related art methods discussed above: in the method of global tone reproduction, contrasts of part of image regions will be lost, thereby making the image looks faded; in the method of global histogram equalization, the output image is unnatural; in the homomorphic filtering method, the display of the edges of the image is unclear, and a halo phenomenon will be produced; and in the multi-scale Retinex algorithm, a halo phenomenon can still not be eliminated.

Embodiments of the present disclosure provide an apparatus for image contrast enhancement and a method for electronic equipment, in which by dividing the input image into at least two layers with different detail degrees and performing contrast enhancement on the at least two layers at different degrees, the contrast of the image may be accurately and effectively enhanced, thereby a display effect of the image may be improved.

According to a first aspect of embodiments of the present disclosure, there is provided an apparatus for image contrast enhancement, including: a dividing unit configured to divide an input image into at least two layers; and detail degrees of the at least two layers are different; an enhancing unit configured to respectively perform contrast enhancement on each of the at least two layers; and degrees of contrast enhancement of the layers are different; and a combining unit configured to combine the contrast-enhanced at least two layers.

According to a second aspect of embodiments of the present disclosure, there is provided electronic equipment, including the apparatus as described in the first aspect of the embodiments of the present disclosure.

According to a third aspect of embodiments of the present disclosure, there is provided a method for image contrast enhancement, including: dividing an input image into at least two layers; and detail degrees of the at least two layers are different; performing contrast enhancement on each of the at least two layers respectively; and degrees of contrast enhancement of the layers are different; and combining the contrast-enhanced at least two layers.

An advantage of embodiments of the present disclosure exists in that by dividing the input image into at least two layers with different detail degrees and performing contrast enhancement on the at least two layers at different degrees, the contrast of the image may be effectively enhanced, thereby a visual display effect of the image may be improved.

With reference to the following description and drawings, the particular embodiments of the present disclosure are disclosed in detail, and the principle of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings using ordinary skill. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of the present disclosure shall be described below with reference to the accompanying drawings. These embodiments are illustrative only, and are not intended to limit the present disclosure.

Embodiment 1

Figure 1:
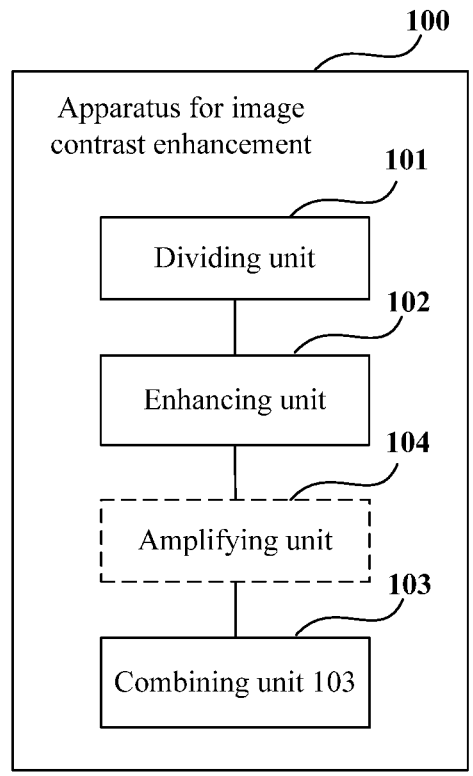
FIG. 1 is a schematic diagram of a structure of the apparatus for image contrast enhancement according to Embodiment 1 of the present disclosure.

FIG. 1 is a schematic diagram of a structure of the apparatus for image contrast enhancement according to Embodiment 1 of the present disclosure. As shown in FIG. 1, the apparatus 100 includes: a dividing unit 101, an enhancing unit 102 and a combining unit 103.

The dividing unit 101 is configured to divide an input image into at least two layers; wherein detail degrees of the at least two layers are different;

the enhancing unit 102 is configured to respectively perform contrast enhancement on each of the at least two layers; wherein degrees of contrast enhancement of the layers are different;

and the combining unit 103 is configured to combine the contrast-enhanced at least two layers.

It can be seen from the above embodiment that by dividing the input image into at least two layers with different detail degrees and performing contrast enhancement on the at least two layers at different degrees, the contrast of the image may be accurately and effectively enhanced, thereby a visual display effect of the image may be improved.

In this embodiment, any existing method may be used by the dividing unit 101 to divide the input image into at least two layers of different detail degrees. A structure of the dividing unit and a dividing method used by it in embodiments of the present disclosure shall be illustrated below.

Figure 2:
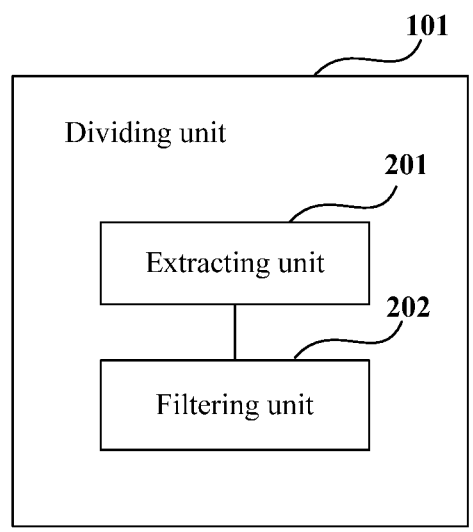
FIG. 2 is a schematic diagram of a structure of the dividing unit of Embodiment 1 of the present disclosure.

FIG. 2 is a schematic diagram of a structure of the dividing unit 101 of Embodiment 1 of the present disclosure. As shown in FIG. 2, the dividing unit 101 includes: an extracting unit 201 and a filtering unit 202.

The extracting unit 201 is configured to extract a luminance component of the input image;

and the filtering unit 202 is configured to use different filtering coefficients to perform edge-preserving filtering on the luminance component, so as to obtain at least two layers; wherein the at least two layers include a background layer and at least one detail layer, the background layer and detail layer respectively including at least two regions of different contrasts.

Figure 3:
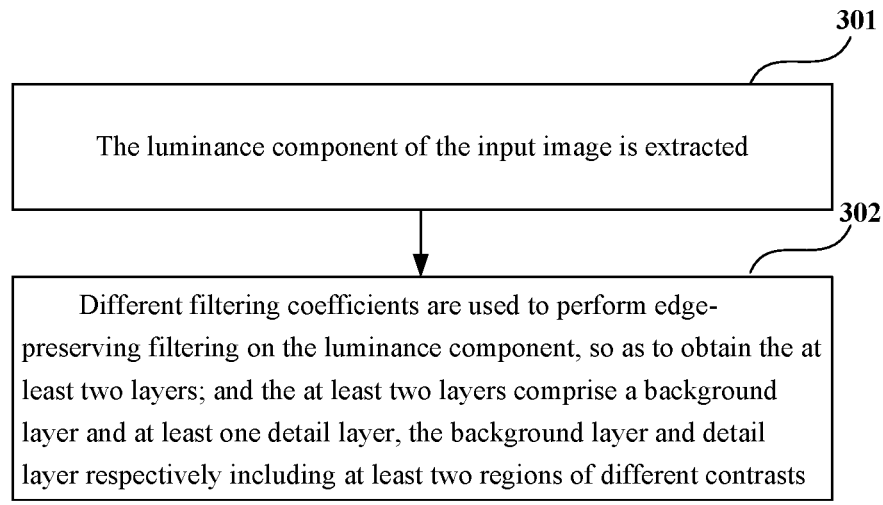
FIG. 3 is a flowchart of a method for dividing an image by the dividing unit according to Embodiment 1 of the present disclosure.

FIG. 3 is a flowchart of a method for dividing an image by the dividing unit according to Embodiment 1 of the present disclosure. As shown in FIG. 3, the method includes:

Step 301: the luminance component of the input image is extracted; and

Step 302: different filtering coefficients are used to perform edge-preserving filtering on the luminance component, so as to obtain at least two layers; and the at least two layers comprise a background layer and at least one detail layer, the background layer and detail layer respectively including at least two regions of different contrasts.

By using the edge-preserving filtering to divide the input image into layers, a display effect of the edge parts of the image may be improved, and generation of a halo phenomenon may be avoided.

In this embodiment, any existing method may be used for extracting the luminance component of the input image. For example, when the input image is a color image, a color space conversion may be performed on the input image. For example, the input image may be transformed into a YCbCr space, with an obtained Y component being the luminance component of the input image, and when the input image is a gray level image, the luminance component Y of the input image may be obtained directly, for example, the luminance component Y may be expressed by a floating-point number for each pixel of the input image, $0 \le Y \le 1$.

In this embodiment, any existing method may be used for performing edge-preserving filtering on the luminance component. The method for edge-preserving filtering used in embodiments of the present disclosure shall be illustrated below.

For example, weighted least squares (WLS) may be used to perform the edge-preserving filtering. For an input image g, the weighted least squares is used to perform edge-preserving filtering on the input image g, so as to obtain an output image f, and the output image f is made to be as close to the input image g as possible, while making other parts in the image than those with obvious gradients to be as smooth as possible. For example, an optimization constraint condition for the weighted least squares filtering may be expressed by Formulas (1) and (2) below:

$$\arg\min_f \left( \sum_p \left( (f_p - g_p)^2 + \lambda \left( a_{x,p}(g) \left(\frac{\partial f}{\partial x}\right)_p^2 + a_{y,p}(g) \left(\frac{\partial f}{\partial y}\right)_p^2 \right) \right) \right); \quad (1)$$

$$a_{x,p}(g) = \left( \left| \frac{\partial \log(g)}{\partial x}(p) \right|^\alpha + \varepsilon \right)^{-1} \quad a_{y,p}(g) = \left( \left| \frac{\partial \log(g)}{\partial y}(p) \right|^\alpha + \varepsilon \right)^{-1}; \quad (2)$$

where, p denotes a spatial position of a pixel, $a_{x,p}(g)$ and $a_{y,p}(g)$ respectively denote smooth weights of the pixel p in the directions of x-axis and y-axis, $\lambda$ denotes a filtering coefficient (the bigger a value of $\lambda$ is, the higher a smoothness of the filtered image f is), $\alpha$ denotes a gradient sensitive index of the input image g, and $\varepsilon$ denotes a tiny constant, which is used for avoiding that a divisor is 0, for example, $\varepsilon = 0.0001$.

By using the weighted least squares to perform the edge-preserving filtering on the luminance component of the input image, smoothing processing may be better performed on the edge parts of the image, thereby further improving a display effect of the edge parts of the image.

For the determined gradient sensitive index α and changing filtering coefficient λ, luminance of the images filtered at different smooth levels may be obtained, which may be expressed by Formula (3) below:

$$Y_0 = F_{WLS}(Y, \alpha, \lambda_0)$$
$$Y_1 = F_{WLS}(Y, \alpha, \lambda_1) \quad (3);$$

where, α denotes a gradient sensitive index, which is unchanged, λ denotes a filtering coefficient, which is a variable, and $Y_0$ and $Y_1$ respectively denote luminance of the filtered images corresponding to filtering coefficients $\lambda_0$ and $\lambda_1$. For example, $\lambda_1$ is greater than $\lambda_0$, hence, the smooth degree of $Y_1$ is higher than that of $Y_0$.

The at least two layers including a background layer and at least one detail layer may be constructed on the basis of the above $Y_0$ and $Y_1$. For example, a background layer, a medium detail layer and a fine detail layer may be constructed by using Formula (4) below:

$$C = Y_1$$
$$M = Y_0 - Y_1$$
$$F = Y - Y_0 \quad (4);$$

where, C denotes luminance of the background layer, M denotes luminance of the medium detail layer, and F denotes luminance of the fine detail layer. The background layer does not have a detail component, and the fine detail layer has more detail components than the medium detail layer.

In this way, the embodiment of the present disclosure obtains at least two layers of different detail degrees by using the above illustrative structure of the dividing unit and the dividing method. And as the edge-preserving filtering method is used, each of the obtained at least two layers has at least two regions of different contrasts.

In this embodiment, the enhancing unit 102 is configured to respectively perform contrast enhancement on each of the at least two layers; degrees of contrast enhancement of the layers are different. This embodiment of the present disclosure may use any method in the prior art to perform the above contrast enhancement. The contrast enhancement method used by this embodiment of the present disclosure shall be illustrated below.

For example, the enhancing unit 102 determines respectively luminance gain functions used for the background layer and the at least one detail layer on the basis of the luminance of the background layer, and uses the luminance gain function for the background layer and the luminance gain function for the at least one detail layer to respectively perform contrast enhancement on the background layer and the at least one detail layer.

For example, the luminance gain function of each of the detail layers of the at least one detail layer is identical, and the luminance gain function of the at least one detail layer is different from the luminance gain function of the background layer.

For example, the luminance gain function of the background layer determined by the enhancing unit 102 on the basis of the luminance of the background layer may be expressed by Formula (5) below:

$$G(C(x)) = \begin{cases} \dfrac{q}{p}, & 0 \le C(x) < p \\ \dfrac{r-q}{r-p} + \dfrac{r(q-p)}{(r-p)C(x)}, & p \le C(x) < r \\ \dfrac{r-s}{r-1} + \dfrac{r(s-1)}{(r-1)C(x)}, & r \le C(x) \le 1 \end{cases} \quad (5)$$

where, G(C(x)) denotes the luminance gain function of the background layer, C(x) denotes the luminance of the background layer, 0≤C(x)≤1, p and q denote under-exposed gain coefficients, s denotes an over-exposed suppressing coefficient, and r denotes a luminance unchanging coefficient, 0<p<q<r<s<1.

It can be seen from above Formula (5) that for regions of different luminance in the background layer, the luminance gain functions are different. In this embodiment, for a region of luminance less than p, luminance gain is performed by using p and q; for a region of luminance greater than or equal to p and less than r, luminance adjustment is performed by using r, p and q; and for a region of luminance greater than or equal to r and less than or equal to 1, luminance suppression is performed by using r and s.

By using different luminance gain functions in regions of different luminance, contrast may further be enhanced accurately and effectively.

The luminance gain function of the at least one detail layer determined by the enhancing unit 102 on the basis of the luminance of the background layer may be expressed by Formula (6) below:

$$H(C(x)) = \begin{cases} \dfrac{(q+r)/2}{p}, & 0 \le C(x) < p \\ \dfrac{r-(q+r)/2}{r-p} + \dfrac{r((q+r)/2 - p)}{(r-p)C(x)}, & p \le C(x) < r \\ \dfrac{r-s}{r-1} + \dfrac{r(s-1)}{(r-1)C(x)}, & r \le C(x) \le 1 \end{cases} \quad (6)$$

where, H(C(x)) denotes the luminance gain function of the at least one detail layer, C(x) denotes the luminance of the background layer, 0≤C(x)≤1, p and q denote under-exposed gain coefficients, s denotes an over-exposed suppressing coefficient, and r denotes a luminance unchanging coefficient, 0<p<q<r<s<1.

In this embodiment, the under-exposed gain coefficients p and q, the over-exposing suppressing coefficient s and the luminance unchanging coefficient r may be set according to an actual situation of the input image and an actual demand. For example, following values may be taken: p=16/255, q=130/255, r=160/255, s=230/255; however, this embodiment is not limited thereto.

In this embodiment, after determining the luminance gain functions of the background layer and the at least one detail layer, the enhancing unit 102 may use the luminance gain function of the background layer and the luminance gain function of the at least one detail layer to respectively perform contrast enhancement on the background layer and the at least one detail layer.

After obtaining the luminance gain function G(C(x)) of the background layer and the luminance gain function H(C(x)) of the detail layer, for the cases of division into the background layer C, the medium detail layer M and the fine detail layer F in this embodiment, the gained luminance of the layers may be expressed by Formula (7) below:

$$C_e(x) = C(x) \cdot G(C(x))$$
$$M_e(x) = M(x) \cdot H(C(x))$$
$$F_e(x) = F(x) \cdot H(C(x)) \quad (7);$$

where, $C_e(x)$, $M_e(x)$ and $F_e(x)$ respectively denote luminance of the background layer C, medium detail layer M and fine detail layer F after the contrast enhancement, C(x), M(x)

and F(x) respectively denote luminance of the background layer C, medium detail layer M and fine detail layer F before the contrast enhancement, G(C(x)) denotes the luminance gain function of the background layer, and H(C(x)) denotes the luminance gain functions of the medium detail layer M and the fine detail layer F.

Figure 4:
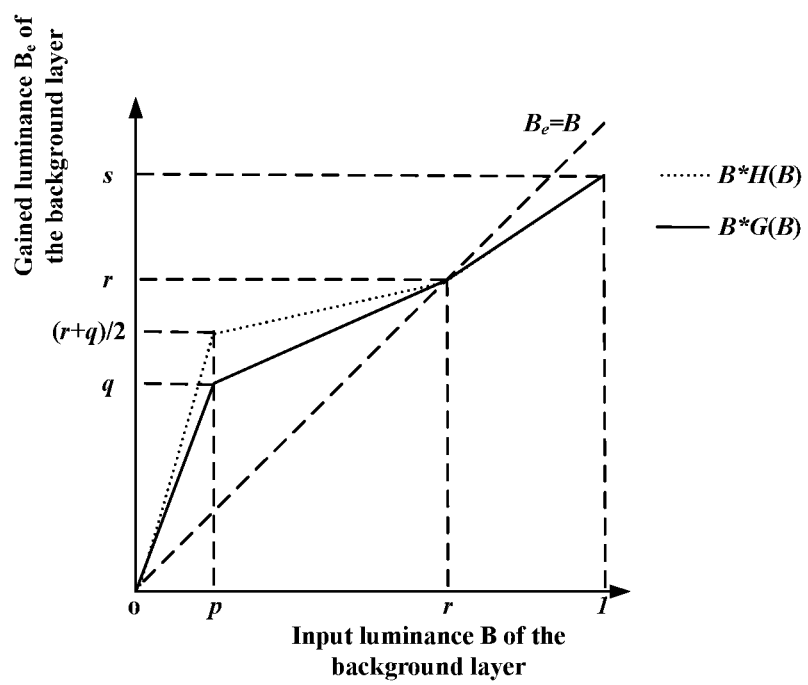
FIG. 4 is a schematic diagram of gain curves of the luminance gain functions according to Embodiment 1 of the present disclosure.

FIG. 4 is a schematic diagram of gain curves of the luminance gain functions according to this embodiment. As shown in FIG. 4, the horizontal axis denotes input luminance B of the background layer, and the vertical axis denotes gained luminance $B_e$ of the background layer; the solid line "-" denotes gained luminance $B_e$ of the background layer by using G(C(x)), and the dotted line "..." denotes gained luminance $B_e$ of the background layer by using H(C(x)).

In this embodiment, as shown in FIG. 1, the apparatus 100 may further include an amplifying unit 104; in this embodiment, the amplifying unit 104 is configured to perform detail amplifying processing on a detail layer with the most detail components in the contrast-enhanced at least one detail layer.

In this embodiment, the amplifying unit 104 is optional, which is shown by a dotted box in FIG. 1.

In this way, by performing detail amplifying processing on the detail layer with the most detail components, display of details of the image may be enhanced, thereby a display effect of the image may be improved further.

In this embodiment, any existing method may be used to perform detail amplifying processing on the detail layer with the most detail components.

For example, the amplifying unit 104 uses an S-type function to transform the luminance of the detail layer with the most detail components in the contrast-enhanced at least one detail layer, so as to achieve detail amplification processing.

Figure 5:
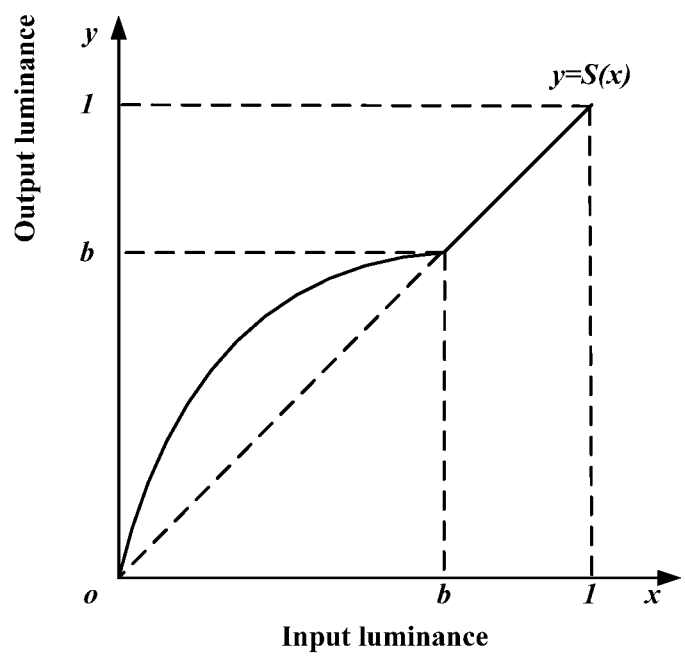
FIG. 5 is a schematic diagram of a curve of an S-type function used for detail amplification according to Embodiment 1 of the present disclosure.

FIG. 5 is a schematic diagram of a curve of the S-type function used for detail amplification according to this embodiment. As shown in FIG. 5, the S-type function may be expressed by Formula (8) below:

$$S(x) = \begin{cases} \dfrac{b(1+e^{-ab})}{1-e^{-ab}} \cdot \dfrac{1-e^{\alpha x}}{1+e^{-\alpha x}}, & 0 \leq x < b \\ x, & b \leq x \leq 1 \end{cases} \quad (8)$$

where, a denotes a gain degree adjusting coefficient, and b denotes a luminance cut-off value, a>0, 0<b≤1.

In this embodiment, a and b may be set according to an actual situation of the image and an actual demand. For example, following values may be taken: a=8, b=0.6; however, this embodiment is not limited thereto.

In this embodiment, the detail layer with the most detail components is the fine detail layer F, and the luminance of the fine detail layer after being detail amplification processed by using the S-type function may be expressed by Formula (9) below:

$$F_s(x) = S(F_e(x)) \quad (9);$$

where, $F_s(x)$ denotes the luminance of the fine detail layer F after being detail amplification processed, and $F_e(x)$ denotes the luminance of the fine detail layer F after being contrast enhanced.

In this embodiment, after the detail amplification processing is performed on the detail layer with the most detail components, i.e. the fine detail layer F, the combining unit 103 combines the luminance of the contrast-enhanced background layer, the luminance of the contrast-enhanced medium detail layer and the luminance of the detail-amplified fine detail layer, which is expressed by Formula (10) below:

$$Y_e(x) = C_e(x) + M_e(x) + F_s(x) \quad (10);$$

where, $Y_e(x)$ denotes combined luminance, $C_e(x)$ denotes the luminance of the contrast-enhanced background layer, $M_e(x)$ denotes the luminance of the contrast-enhanced medium detail layer, and $F_s(x)$ denotes the luminance of the detail-amplified fine detail layer.

In this embodiment, when the input image is a gray level image, $Y_e(x)$ may be directly outputted and taken as the output image; and when the input image is a color image, color reconstruction may be performed on the basis of $Y_e(x)$ and RGB components of the input image. In this embodiment, any existing method may be used for performing the color reconstruction.

For example, the color reconstruction may be performed by using Formula (11) below, so as to obtain the output image:

$$I_e^c(x) = \beta \cdot \left(\dfrac{Y_e(x)}{Y(x)} I^c(x)\right) + (1-\beta) \cdot (Y_e(x) - Y(x) + I^c(x)); \quad (11)$$

where, $I_e^c(x)$ denotes reconstructed RGB components, $I^c(x)$ denotes the RGB components of the input image, $Y(x)$ denotes the luminance of the input image, $Y_e(x)$ denotes the combined luminance, and β denotes a saturation adjustment parameter, 0≤β≤1. In this embodiment, when β=0, saturation of the output image is lacked; and when β=1, saturation of the output image is excessive, and the saturation adjustment parameter β may be set according to an actual situation; for example, β=0.6.

It can be seen from the above embodiment that by dividing the input image into at least two layers with different detail degrees and performing contrast enhancement on the at least two layers at different degrees, the contrast of the image may be accurately and effectively enhanced, thereby a display effect of the image may be improved.

Furthermore, by using the edge-preserving filtering to divide the input image into layers, a display effect of the edge parts of the image may be improved, and generation of a halo phenomenon may be avoided.

By using the weighted least squares to perform the edge-preserving filtering on the luminance component of the input image, smoothing processing may be better performed on the edge parts of the image, thereby a display effect of the edge parts of the image may be improved further.

By using different luminance gain functions in regions of different luminance, contrast may further be enhanced accurately and effectively.

And by performing detail amplifying processing on the detail layer with the most detail components, display of details of the image may be enhanced, thereby a display effect of the image may be improved further.

Embodiment 2

An embodiment of the present disclosure provides electronic equipment, including the apparatus for image contrast enhancement according to Embodiment 1.

Figure 6:
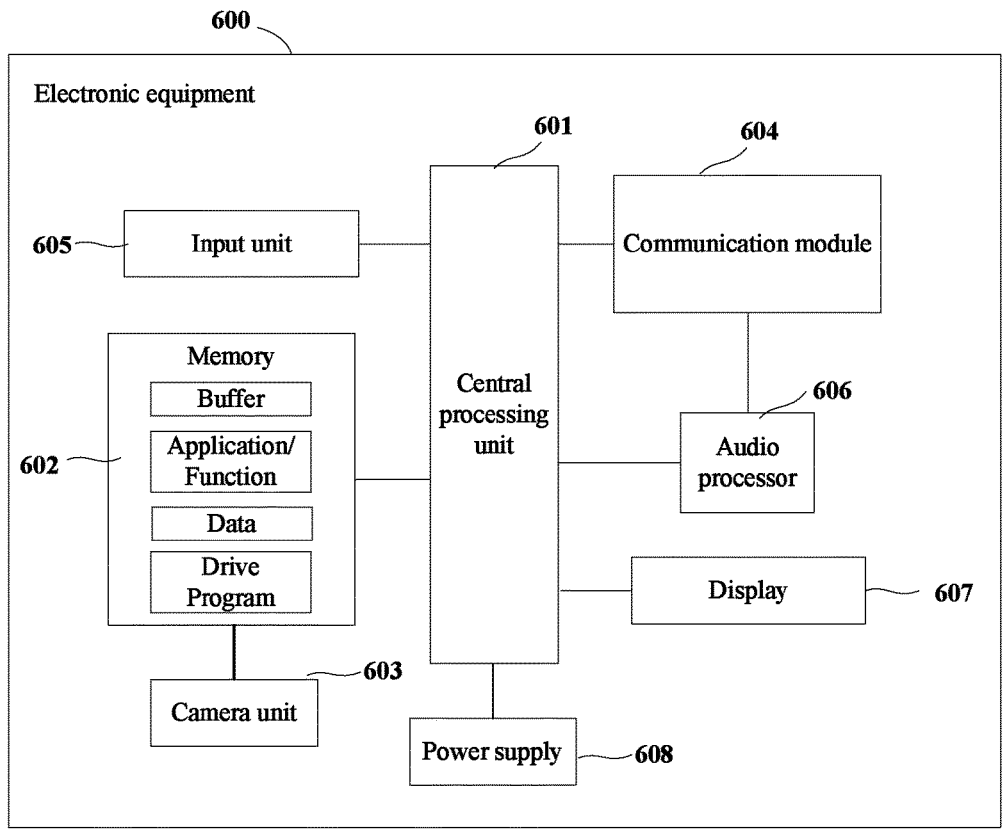
FIG. 6 is a block diagram of a systematic structure of the electronic equipment according to Embodiment 2 of the present disclosure.

FIG. 6 is a block diagram of a systematic structure of the electronic equipment according to Embodiment 2 of the present disclosure. As shown in FIG. 6, the electronic equipment 600 may include a central processing unit 601 and a memory 602, the memory 602 being coupled to the central processing unit 601. This figure is illustrative only, and other types of structures may also be used, so as to supplement or replace this structure and achieve telecommunications function or other functions.

As shown in FIG. 6, the electronic equipment 600 may further include a camera unit 603, a communication module 604, an input unit 605, an audio processor 606, a display 607, and a power supply 608. In this embodiment, the camera unit 603 may input shot images into the memory 602 for storage.

In an implementation, the function of the apparatus for image contrast enhancement may be integrated into the central processing unit 601. For example, the central processing unit 601 may be configured to: divide an input image into at least two layers; and detail degrees of the at least two layers are different; perform contrast enhancement on each of the at least two layers respectively; and degrees of contrast enhancement of the layers are different; and combine the contrast-enhanced at least two layers.

For example, dividing an input image into at least two layers includes: extracting a luminance component of the input image; and using different filtering coefficients to perform edge-preserving filtering on the luminance component, so as to obtain the at least two layers; and the at least two layers comprise a background layer and at least one detail layer, the background layer and detail layer respectively including at least two regions of different contrasts.

For example, using different filtering coefficients to perform edge-preserving filtering to the luminance component includes: using weighted least squares (WLS) to perform the edge-preserving filtering.

For example, performing contrast enhancement on each of the at least two layers respectively includes: determining respectively luminance gain functions used for the background layer and the at least one detail layer on the basis of the luminance of the background layer; and using the luminance gain function for the background layer and the luminance gain function for the at least one detail layer to respectively perform contrast enhancement to the background layer and the at least one detail layer.

In this embodiment, the central processing unit 601 may further be configured to: perform detail amplifying processing on a detail layer with the most detail components in the contrast-enhanced at least one detail layer; and the combining the contrast-enhanced at least two layers includes: combining the contrast-enhanced background layer, other detail layers than the detail layer with the most detail components, and the detail-amplified detail layer with the most detail components.

For example, the luminance gain function of each of the detail layers of the at least one detail layer is identical, and the luminance gain function of the at least one detail layer is different from the luminance gain function of the background layer.

For example, performing detail amplifying processing on a detail layer with most detail components in the contrast-enhanced at least one detail layer includes: using an S-type function to transform the luminance of the detail layer with most detail components in the contrast-enhanced at least one detail layer.

In another implementation, the apparatus for image contrast enhancement and the central processing unit 601 may be configured separately. For example, the apparatus for image contrast enhancement may be configured as a chip connected to the central processing unit 601, with its functions being realized under control of the central processing unit.

In this embodiment, the electronic equipment 600 does not necessarily include all the parts shown in FIG. 6.

As shown in FIG. 6, the central processing unit 601 is sometimes referred to as a controller or control, and may include a microprocessor or other processor devices and/or logic devices. The central processing unit 601 receives input and controls operations of every components of the electronic equipment 600.

The memory 602 may be, for example, one or more of a buffer memory, a flash memory, a hard drive, a mobile medium, a volatile memory, a nonvolatile memory, or other suitable devices. And the central processing unit 601 may execute the programs stored in the memory 602, so as to realize information storage or processing, etc. Functions of other parts are similar to those of the prior art, which shall not be described herein any further. The parts of the electronic equipment 600 may be realized by specific hardware, firmware, software, or any combination thereof, without departing from the scope of the present disclosure.

In this embodiment, the electronic equipment is, for example, a portable radio communication apparatus, which includes such an apparatus as a mobile telephone, a smart mobile phone, pager, a communication device, an electronic blotter, a personal digital assistant (PDA), a smart phone, a portable communication device or the like. Furthermore, the electronic equipment may be equipment with a function of camera shooting, and such equipment may have no function of communication, such as a camera, and a video camera, etc. And a type of the electronic equipment is not limited in embodiments of the present disclosure.

It can be seen from the above embodiment that by dividing the input image into at least two layers with different detail degrees and performing contrast enhancement on the at least two layers at different degrees, the contrast of the image may be accurately and effectively enhanced, thereby a display effect of the image may be improved.

Embodiment 3

Figure 7:
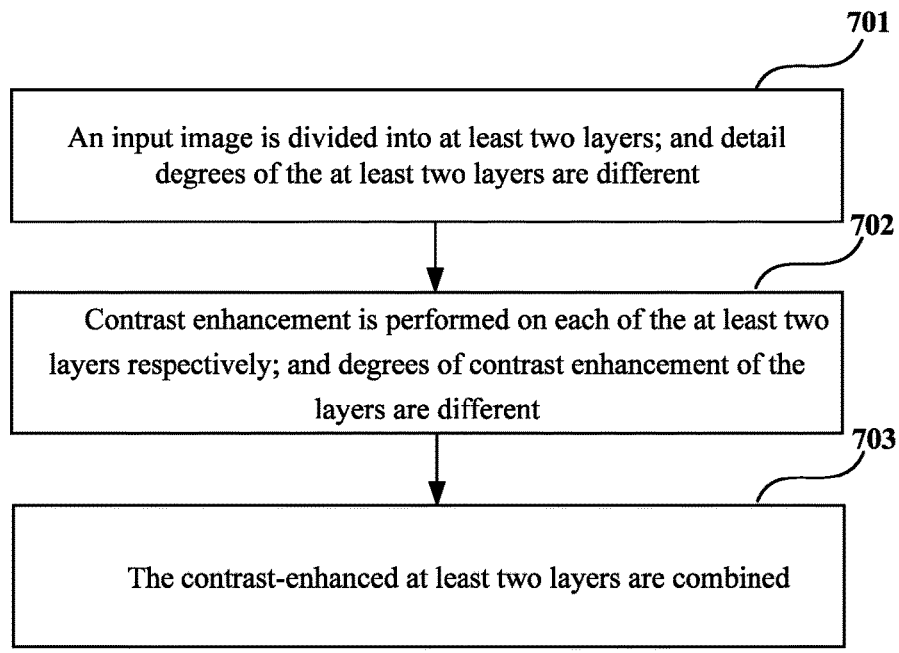
FIG. 7 is a flowchart of the method for image contrast enhancement according to Embodiment 3 of the present disclosure.

FIG. 7 is a flowchart of the method for image contrast enhancement according to Embodiment 3 of the present disclosure, corresponding to the apparatus for image contrast enhancement according to Embodiment 1. As shown in FIG. 7, the method includes:

Step 701: an input image is divided into at least two layers; and detail degrees of the at least two layers are different;

Step 702: contrast enhancement is performed on each of the at least two layers respectively; and degrees of contrast enhancement of the layers are different; and Step 703: the contrast-enhanced at least two layers are combined.

In this embodiment, the method for dividing an input image into at least two layers, the method for performing contrast enhancement on each of the at least two layers and the method for combining the contrast-enhanced at least two layers are identical to those according to Embodiment 1, and shall not be described herein any further.

It can be seen from the above embodiment that by dividing the input image into at least two layers with different detail degrees and performing contrast enhancement on the at least two layers at different degrees, the contrast of the image may be accurately and effectively enhanced, thereby a display effect of the image may be improved.

Embodiment 4

Figure 8:
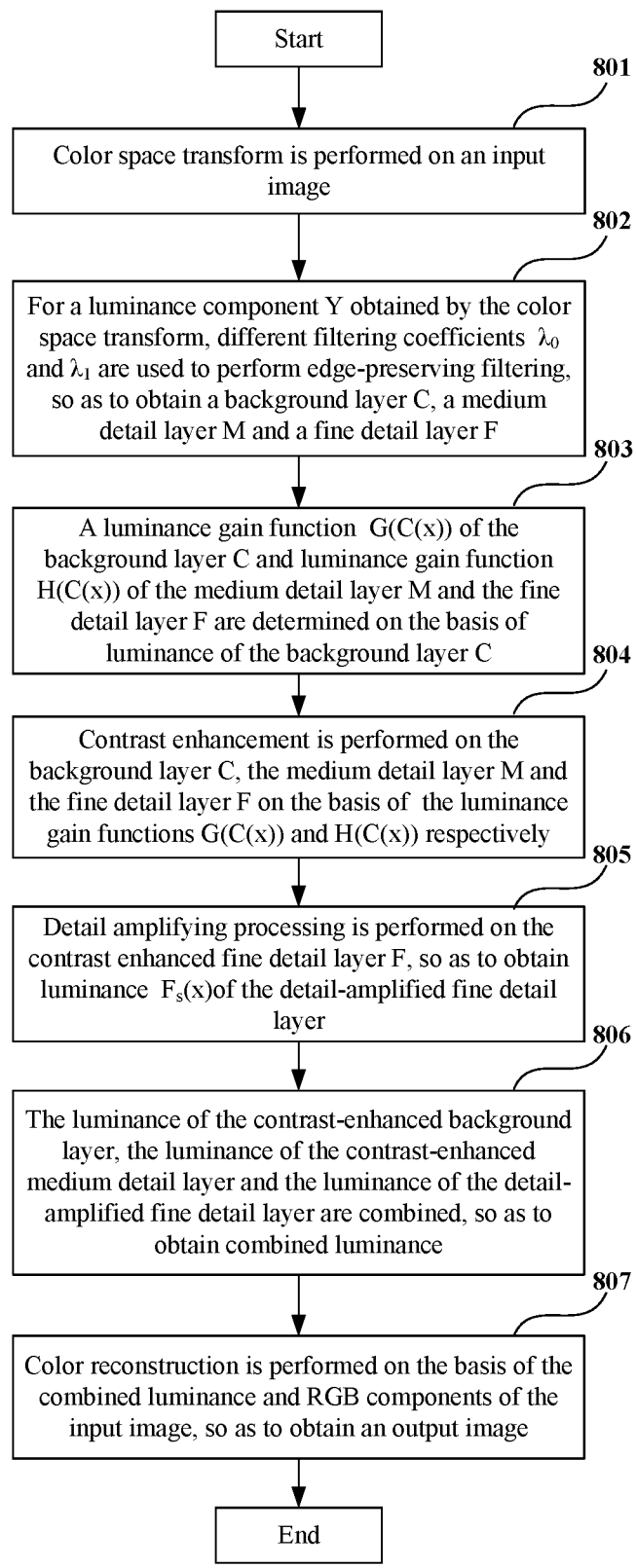
FIG. 8 is a flowchart of the method for image contrast enhancement according to Embodiment 4 of the present disclosure.

FIG. 8 is a flowchart of the method for image contrast enhancement according to Embodiment 4 of the present disclosure, which is used to describe an application example of the apparatus for image contrast enhancement according to Embodiment 1 in enhancing a contrast of a color image. As shown in FIG. 8, the method includes:

Step 801: color space transform is performed on an input image;

Step 802: for a luminance component Y obtained by the color space transform, different filtering coefficients $\lambda_0$ and $\lambda_1$ are used to perform edge-preserving filtering, so as to obtain a background layer C, a medium detail layer M and a fine detail layer F;

Step 803: a luminance gain function $G(C(x))$ of the background layer C and a luminance gain function $H(C(x))$ of the medium detail layer M and the fine detail layer F are determined on the basis of luminance of the background layer C;

Step 804: contrast enhancement is performed on the background layer C, the medium detail layer M and the fine detail layer F on the basis of the luminance gain functions $G(C(x))$ and $H(C(x))$ respectively;

Step 805: detail amplifying processing is performed on the contrast enhanced fine detail layer F, so as to obtain luminance $F_s(x)$ of the detail-amplified fine detail layer;

Step 806: the luminance of the contrast-enhanced background layer, the luminance of the contrast-enhanced medium detail layer and the luminance of the detail-amplified fine detail layer are combined, so as to obtain combined luminance $Y_e(x)$; and Step 807: color reconstruction is performed on the basis of the combined luminance $Y_e(x)$ and RGB components of the input image, so as to obtain an output image.

In this embodiment, the method for performing color space transform on an input image, the method for dividing an input image into at least two layers, the method for determining luminance gain functions of the layers, the method for performing contrast enhancement on the layers, the method for performing detail amplifying processing on the fine detail layer, the method for combining the at least two layers and the method for performing color reconstruction are identical to those according to Embodiment 1, and shall not be described herein any further.

It can be seen from the above embodiment that by dividing the input image into at least two layers with different detail degrees and performing contrast enhancement on the at least two layers at different degrees, the contrast of the image may be accurately and effectively enhanced, thereby a display effect of the image may be improved.

An embodiment of the present disclosure further provides a computer-readable program, and when the program is executed in an apparatus for image contrast enhancement or electronic equipment, the program enables the computer to carry out the method for image contrast enhancement according to Embodiment 3 or 4 in the apparatus for image contrast enhancement or the electronic equipment.

An embodiment of the present disclosure further provides a storage medium in which a computer-readable program is stored, and the computer-readable program enables the computer to carry out the method for image contrast enhancement according to Embodiment 3 or 4 in an apparatus for image contrast enhancement or electronic equipment.

The above apparatuses and methods of the present disclosure may be implemented by hardware, or by hardware in combination with software. The present disclosure relates to such a computer-readable program that when the program is executed by a logic device, the logic device is enabled to realize the apparatus or components as described above, or to carry out the methods or steps as described above. The present disclosure also relates to a nontransitory storage medium for storing the above program/method, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for image contrast enhancement, comprising:

a memory that stores a plurality of instructions; and a processor coupled to the memory and configured to execute the instructions to:

divide an input image into at least two layers, where degrees of detail of the at least two layers are different;

respectively perform contrast enhancement on each of the at least two layers, where degrees of contrast enhancement of the at least two layers are different; and combine the contrast-enhanced at least two layers, wherein the processor is configured to execute the instructions to:

extract a luminance component of the input image; and use different filtering coefficients to perform edge-preserving filtering on the luminance component to obtain the at least two layers;

wherein the at least two layers comprise a background layer and at least one detail layer, the background layer and the detail layer respectively comprising at least two regions of different contrasts, wherein the processor is configured to execute the instructions to:

determine respectively luminance gain functions used for the background layer and the at least one detail layer on a basis of luminance of the background layer, and use a background luminance gain function for the background layer and a detail luminance gain function for the at least one detail layer to respectively perform contrast enhancement on the background layer and the at least one detail layer, wherein the processor is further configured to execute the instructions to:

perform detail amplifying processing on a detail layer with a most detail components in a contrast-enhanced at least one detail layer; and combine a contrast-enhanced background layer, other detail layers than the detail layer with the most detail components, and a detail-amplified detail layer with the most detail components.

2. The apparatus according to claim 1, wherein the processor is configured to execute the instructions to use weighted least squares (WLS) to perform the edge-preserving filtering.

3. The apparatus according to claim 1, wherein a luminance gain function of each of detail layers is identical, and the detail luminance gain function of the at least one detail layer is different from the background luminance gain function of the background layer.

4. The apparatus according to claim 1, wherein the background luminance gain function for the background layer is expressed by Formula (1):

$$G(C(x)) = \begin{cases} \frac{q}{p}, & 0 \le C(x) < p \\ \frac{r-q}{r-p} + \frac{r(q-p)}{(r-p)C(x)}, & p \le C(x) < r \\ \frac{r-s}{r-1} + \frac{r(s-1)}{(r-1)C(x)}, & r \le C(x) \le 1 \end{cases} \quad (1)$$

where, C(x) denotes the luminance of the background layer, 0≤C(x)≤1; p and q denote under-exposed gain coefficients, s denotes an over-exposed suppressing coefficient, and r denotes a luminance unchanging coefficient, 0<p<q<r<s<1.

5. The apparatus according to claim 1, wherein the detail luminance gain function for the at least one detail layer is expressed by Formula (2):

$$H(C(x)) = \begin{cases} \frac{(q+r)/2}{p}, & 0 \le C(x) < p \\ \frac{r-(q+r)/2}{r-p} + \frac{r((q+r)/2-p)}{(r-p)C(x)}, & p \le C(x) < r \\ \frac{r-s}{r-1} + \frac{r(s-1)}{(r-1)C(x)}, & r \le C(x) \le 1 \end{cases} \quad (2)$$

where, C(x) denotes the luminance of the background layer, 0≤C(x)≤1; p and q denote under-exposed gain coefficients; s denotes an over-exposed suppressing coefficient, and r denotes a luminance unchanging coefficient, 0<p<q<r<s<1.

6. The apparatus according to claim 1, wherein the processor is configured to execute the instructions to use an S-type function to transform luminance of the detail layer with the most detail components in the contrast-enhanced at least one detail layer.

7. The apparatus according to claim 6, wherein the S-type function is expressed by Formula (3):

$$S(x) = \begin{cases} \frac{b(1+e^{-ab})}{1-e^{-ab}} \cdot \frac{1-e^{ax}}{1+e^{-ax}}, & 0 \le x < b \\ x, & b \le x \le 1 \end{cases} \quad (3)$$

where, a denotes a gain degree adjusting coefficient, and b denotes a luminance cut-off value, a>0, 0<b≤1.

8. Electronic equipment, comprising the apparatus as claimed in claim 1.

9. A method for image contrast enhancement, comprising:
dividing an input image into at least two layers, where degrees of detail of the at least two layers are different;
performing contrast enhancement on each of the at least two layers respectively, where degrees of contrast enhancement of the layers are different; and
combining the contrast-enhanced at least two layers,
wherein the dividing an input image into at least two layers comprises:
extracting a luminance component of the input image; and
using different filtering coefficients to perform edge-preserving filtering on the luminance component to obtain the at least two layers where the at least two layers comprise a background layer and at least one detail layer; the background layer and detail layer respectively comprising at least two regions of different contrasts,
wherein performing contrast enhancement on each of the at least two layers respectively comprises:
determining respectively luminance gain functions used for the background layer and the at least one detail layer on a basis of luminance of the background layer; and
using a background luminance gain function for the background layer and a detail luminance gain function for the at least one detail layer to respectively perform contrast enhancement on the background layer and the at least one detail layer,
wherein the method further comprises:
performing detail amplifying processing on a detail layer with a most detail components in a contrast-enhanced at least one detail layer; and
the combining the contrast-enhanced at least two layers comprises: combining a contrast-enhanced background layer, other detail layers than the detail layer with the most detail components, and a detail-amplified detail layer with the most detail components.

10. The method according to claim 9, wherein using different filtering coefficients to perform edge-preserving filtering on the luminance component comprises:
using weighted least squares (WLS) to perform the edge-preserving filtering.

11. The method according to claim 9, wherein a luminance gain function of each of the detail layers is identical, and the detail luminance gain function of the at least one detail layer is different from the background luminance gain function of the background layer.

12. The method according to claim 9, wherein the background luminance gain function of the background layer is expressed by Formula (1):

$$G(C(x)) = \begin{cases} \frac{q}{p}, & 0 \le C(x) < p \\ \frac{r-q}{r-p} + \frac{r(q-p)}{(r-p)C(x)}, & p \le C(x) < r \\ \frac{r-s}{r-1} + \frac{r(s-1)}{(r-1)C(x)}, & r \le C(x) \le 1 \end{cases} \quad (1)$$

where, C(x) denotes the luminance of the background layer, 0≤C(x)≤1; p and q denote under-exposed gain coefficients, s denotes an over-exposed suppressing coefficient, and r denotes a luminance unchanging coefficient, 0<p<q<r<s<1.

13. The method according to claim 9, wherein the detail luminance gain function of the at least one detail layer is expressed by Formula (2):

$$H(C(x)) = \begin{cases} \dfrac{(q+r)/2}{p}, & 0 \le C(x) < p \\ \dfrac{r-(q+r)/2}{r-p} + \dfrac{r((q+r)/2 - p)}{(r-p)C(x)}, & p \le C(x) < r \\ \dfrac{r-s}{r-1} + \dfrac{r(s-1)}{(r-1)C(x)}, & r \le C(x) \le 1 \end{cases} \quad (2)$$

where, C(x) denotes the luminance of the background layer, 0≤C(x)≤1; p and q denote under-exposed gain coefficients, s denotes an over-exposed suppressing coefficient, and r denotes a luminance unchanging coefficient, 0<p<q<r<s<1.

14. The method according to claim 9, wherein performing detail amplifying processing on a detail layer with most detail components in the contrast-enhanced at least one detail layer comprises:

using an S-type function to transform luminance of the detail layer with the most detail components in the contrast-enhanced at least one detail layer.

15. A non-transitory computer readable storage medium storing a method for image contrast enhancement comprising:

dividing an input image into at least two layers, where degrees of detail of the at least two layers are different;

performing contrast enhancement on each of the at least two layers respectively, where degrees of contrast enhancement of the layers are different; and combining the contrast-enhanced at least two layers, wherein the dividing an input image into at least two layers comprises:

extracting a luminance component of the input image; and using different filtering coefficients to perform edge-preserving filtering on the luminance component to obtain the at least two layers where the at least two layers comprise a background layer and at least one detail layer, the background layer and detail layer respectively comprising at least two regions of different contrasts, wherein performing contrast enhancement on each of the at least two layers respectively comprises:

determining respectively luminance gain functions used for the background layer and the at least one detail layer on a basis of luminance of the background layer; and using a background luminance gain function for the background layer and a detail luminance gain function for the at least one detail layer to respectively perform contrast enhancement on the background layer and the at least one detail layer, wherein the method further comprises:

performing detail amplifying processing on a detail layer with a most detail components in a contrast-enhanced at least one detail layer; and the combining the contrast-enhanced at least two layers comprises: combining a contrast-enhanced background layer, other detail layers than the detail layer with the most detail components, and a detail-amplified detail layer with the most detail components.

\* \* \* \* \*